Patented Jan. 25, 1944

2,340,233

UNITED STATES PATENT OFFICE 2,340,233

NONTARNISHING RUBBER PRODUCT AND METHOD OF MAKING THE SAME

Andrew Szegvari, Fairlawn, Ohio, assignor to American Anode Inc., Akron, Ohio, a corporation of Delaware No Drawing. Application November 1, 1939, Serial No. 302,363

4 Claims. (Cl. 260—821)

This invention relates to a non-tarnishing rubber product and to a method of making the same and particularly to a method of treating rubber and rubber-like materials so as to remove or render inert any sulfur materials on or near the surface of the rubber.

The sulfur materials including elemental sulfur and sulfur-containing compounds that are found in vulcanized rubber as well as in certain synthetic rubbers are prone to attack any susceptible object with which the rubber comes into contact. This is particularly noticeable in the tarnishing of silverware when it is cleaned in a rubber-lined dish washing machine. Other examples are when such susceptible materials are stored in a rubber-lined storage chest or on rubber-covered shelves. When rubber is bonded to metal, the metal itself is very often attacked by sulfur present in the vulcanized rubber. For convenience, all such deleterious effects will be herein termed tarnishing effects.

I have discovered a method of treating solid rubber as distinguished from rubber in any liquid form and particularly rubber coagulum that has been deposited from aqueous dispersions whereby sulfur materials in the rubber are rendered inert with the result that objects normally subject to attack by the sulfur may be placed in close contact with the finished rubber and still be unaffected. In a preferred embodiment, a completely coagulated deposit of rubber coagulum containing sulfur material is produced by coagulating a compounded aqueous dispersion of rubber in any well known manner, and the coagulated deposit is treated, while still in a substantially undried water-containing condition, with an aqueous solution of a water-soluble compound of one of the inorganic metallic elements of Groups II and III of the generally followed qualitative analysis scheme of Treadwell and Hall. (F. P. Treadwell and W. T. Hall "Analytical Chemistry," vol. I; eighth English edition; pages 133 and 207; published in 1932 by John Wiley and Sons, New York.) For example, the bath may be a solution of zinc ammonium chloride in dilute ammonium hydroxide, in which case zinc sulfide will be precipitated out. This treatment serves either to precipitate the sulfur or to render it inert in the sense of rendering it incapable of deleteriously affecting other objects, but the treatment does not interfere with the vulcanizing action of the sulfur.

As examples of the treating baths that may be used in this invention I have found that the following will give excellent results: A solution of lead nitrate in water; a solution of bismuth acetate in dilute acetic acid; a solution of cupric nitrate, sulfate or chloride in water; a solution of cadmium nitrate, sulfate or chloride in water; a solution of zinc hydroxide in dilute potassium hydroxide; a solution of zinc ammonium chloride in dilute ammonium hydroxide; a solution of cobalt(ous) ammonium chloride in water; a solution of nickel hydroxide in ammonium hydroxide; a solution of stannous chloride in dilute hydrochloric acid; a solution of nickel ammonium hydroxide in dilute ammonium hydroxide; a solution of ferrous nitrate in water; a solution of mercuric chloride in water and analogous compounds of the same or similar metals.

No particular concentration of metallic compound in the treating bath is essential to the invention and widely varying concentrations may be used with satisfaction. Most of the metallic compounds employed are soluble only to a limited degree and it will accordingly be convenient for ordinary factory operations to utilize solutions which are substantially saturated with the metallic compound. Such solutions are readily prepared and may be reproduced from time to time by ordinary workmen without expert supervision.

As a preferred embodiment of this invention, a rubber deposit is formed from latex that has been compounded with the usual vulcanizing agents including sulfur, fillers, accelerators, age-resistors, coloring agents and the like. This deposited rubber, while it is still wet, is then immersed in a solution of zinc ammonium chloride in weak ammonium hydroxide for five minutes. It is then withdrawn, washed and vulcanized by heating in the usual manner. By this treatment the sulfur and sulfur-containing compounds on or near the surface of the deposited rubber are rendered inert and are thereby incapable of attacking any susceptible object which may contact the rubber.

Rubber that has been deposited from aqueous dispersions is particularly adaptable for treatment by this invention because such deposited rubber, when freshly deposited, contains considerable amounts of water that is present in a continuous phase throughout the mass of deposited rubber. As the compounds that are used for preparing the solution employed as baths in this invention are water soluble they can penetrate the rubber by means of this continuous water phase and more effectively reach the sulfur in the interior of the mass. However, it has been found that this invention is also applicable for treating sulfur-containing compounded dry rubber that has been formed from ordinary solid crude rubber.

The aqueous dispersions of rubber used in this invention may be any naturally occurring or artificially prepared dispersions of rubber and analogous natural or synthetic materials including neoprene that have been compounded with any of the usual compounding materials, including sulfur or sulfur-compounds, as employed by those skilled in the art.

Having herein described preferred embodiments of my invention it is my wish to protect it broadly limited only by the spirit and scope of the appended claims.

I claim:

1. A method of making a non-tarnishing rubber product which comprises preparing a solid rubber composition having a continuous water phase and containing sulfur material, and treating the composition with an aqueous solution of a water-soluble zinc salt, the treatment with zinc salt being effected while the continuous water phase is present in the rubber composition.

2. A method of producing a non-tarnishing rubber product which comprises coagulating rubber from a compounded aqueous dispersion of rubber containing sulfur material to produce a rubber coagulum containing sulfur material and a continuous water phase and, while the continuous water phase is present, treating the coagulum with a solution of a water-soluble complex zinc salt.

3. A method of producing a non-tarnishing rubber product which comprises coagulating rubber from a compounded aqueous dispersion of rubber containing sulfur material to produce a rubber coagulum containing sulfur material and a continuous water phase and, while the continuous water phase is present, treating the coagulum with a liquid composition comprising zinc ammonium chloride in a dilute aqueous solution of ammonium hydroxide.

4. An article of manufacture, such as a dishwashing machine, having a rubber portion which in normal use comes in contact with articles, such as articles of silverware, which are tarnished or otherwise damaged by contact with sulfur materials, such as sulfur or sulfur-containing compounds, ordinarily present in rubber, said rubber product including such sulfur material present as a non-tarnishing compound comprising the reaction product of the sulfur material with a water-soluble complex zinc salt, said rubber product being prepared by treating the rubber while in a coagulated but undried, water-containing condition with an aqueous solution of the said complex zinc salt.

ANDREW SZEGVARI.